United States Patent
Lee et al.

(10) Patent No.: US 8,828,165 B2
(45) Date of Patent: Sep. 9, 2014

(54) SPACING INTERVAL CONTROL METHOD AND SHEET LAMINATING APPARATUS USING THE SAME

(71) Applicant: Primax Electronics Ltd., Taipei (TW)

(72) Inventors: Bin-Tao Lee, Taipei (TW); Yung-Tai Pan, Taipei (TW); Hong-Qiang Liu, Taipei (TW); Jiang-Wei Wu, Taipei (TW)

(73) Assignee: Primax Electronics Ltd., Taipei (TW)

(*) Notice: Subject to any disclaimer, the term of this patent is extended or adjusted under 35 U.S.C. 154(b) by 0 days.

(21) Appl. No.: 13/734,451

(22) Filed: Jan. 4, 2013

(65) Prior Publication Data

US 2013/0119599 A1    May 16, 2013

Related U.S. Application Data

(62) Division of application No. 12/557,306, filed on Sep. 10, 2009, now abandoned.

(30) Foreign Application Priority Data

Apr. 24, 2009  (TW) .................. 98113592 A (51) Int. Cl.
| | |
|---|---|
| B32B 41/00 | (2006.01) |
| B65H 7/20 | (2006.01) |
| B32B 38/18 | (2006.01) |
| B65H 29/20 | (2006.01) |
| B65H 7/02 | (2006.01) |
| B65H 39/14 | (2006.01) |
| B32B 37/22 | (2006.01) |

(52) U.S. Cl.
CPC ............... *B65H 7/02* (2013.01); *B32B 37/223* (2013.01); *B65H 2701/1313* (2013.01); *B65H 7/20* (2013.01); *B32B 38/185* (2013.01); *B32B 41/00* (2013.01); *B32B 2429/00* (2013.01); *B65H 2301/541* (2013.01); *B65H 2511/514* (2013.01); *B65H 2301/4452* (2013.01); *B32B 2309/70* (2013.01); *B65H 2513/512* (2013.01); *B65H 2701/1311* (2013.01); *B65H 2513/514* (2013.01); *B65H 2301/44324* (2013.01); *B65H 29/20* (2013.01); *B65H 39/14* (2013.01)
USPC .......................................................... 156/64

(58) Field of Classification Search
USPC ........... 156/64, 351, 352, 363, 364, 367, 368; 271/10.02, 10.03, 258.01, 258.02, 259, 271/265.01, 265.02
See application file for complete search history.

(56) References Cited

U.S. PATENT DOCUMENTS

| | | | | |
|---|---|---|---|---|
| 6,170,816 | B1 * | 1/2001 | Gillmann et al. | 271/10.03 |
| 6,536,497 | B2 * | 3/2003 | Cook | 156/362 |
| 2005/0082739 | A1 * | 4/2005 | Mitsuya et al. | 271/10.11 |
| 2006/0263103 | A1 * | 11/2006 | Bisset et al. | 399/16 |
| 2007/0074810 | A1 * | 4/2007 | Kao | 156/311 |

* cited by examiner

*Primary Examiner* — George Koch
(74) *Attorney, Agent, or Firm* — Kirton McConkie; Evan R. Witt (57) ABSTRACT

A spacing interval control method is used in a sheet laminating apparatus for controlling a constant spacing interval between any two adjacent ones of multiple documents. The sheet laminating apparatus includes an automatic document feeding mechanism and a sheet laminating mechanism. By means of multiple sensors within the automatic document feeding mechanism, multiple documents are successively transported from the automatic document feeding mechanism to the sheet laminating mechanism at a constant spacing interval between any two adjacent ones of multiple documents. As a consequence, the documents after being heated or pressed by the sheet laminating mechanism will be cut into multiple separate and identical-sized laminated documents.

6 Claims, 4 Drawing Sheets

SPACING INTERVAL CONTROL METHOD AND SHEET LAMINATING APPARATUS USING THE SAME

CROSS-REFERENCE TO RELATED APPLICATION

This is a divisional application of U.S. application Ser. No. 12/557,306, filed Sep. 10, 2009, now abandoned which application is incorporated by reference.

FIELD OF THE INVENTION

The present invention relates to a spacing interval control method, and more particularly to a spacing interval control method for controlling a constant spacing interval between any two adjacent documents. The present invention also relates to a sheet laminating apparatus using such a spacing interval control method.

BACKGROUND OF THE INVENTION

With the maturity of automatic document technologies, automatic document feeders are widely used in a diversity of document processing machines such as printers, copiers and multifunction peripherals. The automatic document feeders are used for successively feeding a stack of documents into the inner portion of the document processing machine so as to implement associated operations and achieve the labor-saving purpose.

The conventional automatic document feeders, however, still have some drawbacks. For example, the conventional automatic document feeder is only designed to feed the documents into the inner portion of the document processing machine. In other words, the manufacturer of the conventional automatic document feeder does not consider whether the spacing between any two successive documents in the feeding path is equal. In a case that the conventional automatic document feeder is applied to a sheet laminating apparatus, the automatic document feeder becomes hindrance from operating the sheet laminating apparatus.

Figure 1:
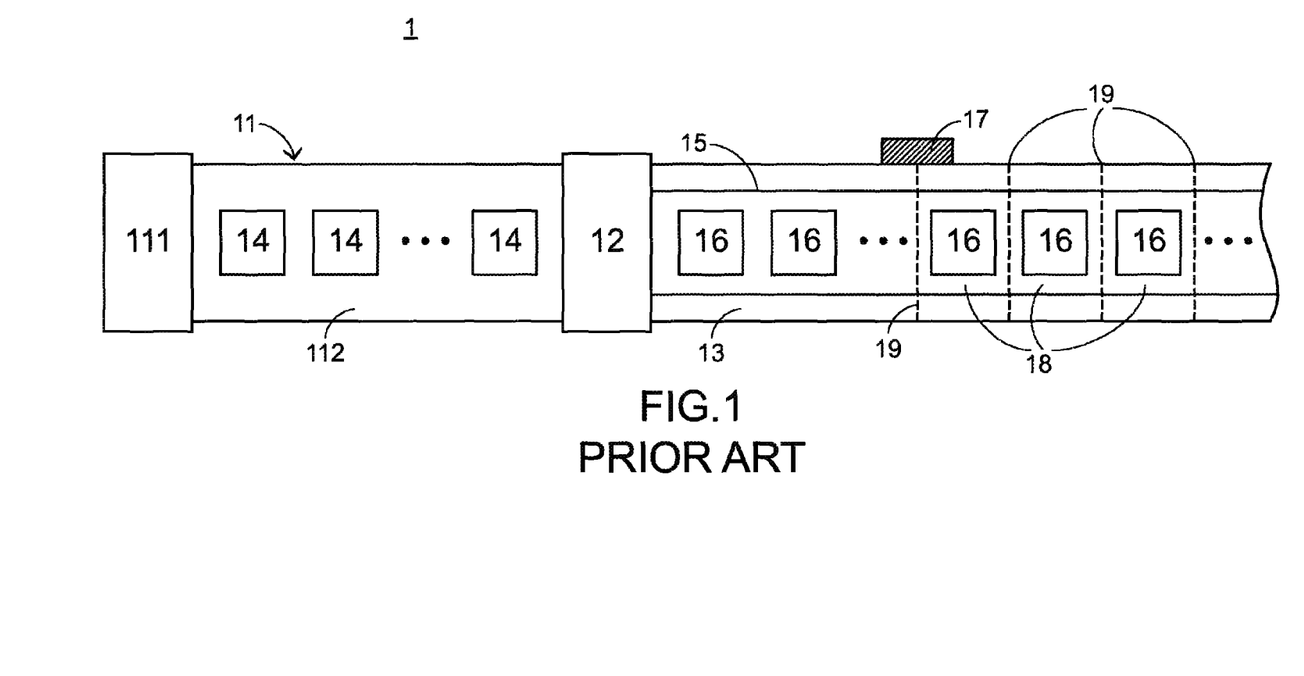
FIG. 1 is a schematic view illustrating the application of a conventional automatic document feeder to a sheet laminating apparatus.

FIG. 1 is a schematic view illustrating the application of a conventional automatic document feeder to a sheet laminating apparatus. The conventional automatic document feeder 11 comprises a sheet pick-up roller 111 and a sheet feeding channel 112. The sheet feeding channel 112 is arranged between the sheet pick-up roller 111 and a sheet laminating mechanism 12. A sheet ejecting path 13 is arranged at the outlet of the sheet laminating mechanism 12. The sheet pick-up roller 111 is used for successively feeding multiple documents 14 into the sheet feeding channel 112. When the documents 14 are fed into the sheet laminating mechanism 12 through the sheet feeding channel 112, the documents 14 are subject to a heating and pressing operation (also referred as a laminating operation) by the sheet laminating mechanism 12. After the heating and pressing operation is performed, the documents 14 are covered with a protective film 15, thereby ejecting corresponding film-covering documents 16 to the sheet ejecting path 13. Next, the film-covering documents 16 are transported across an automatic cutting mechanism 17. The cutting lines 19 of these film-covering documents 16 are successively cut by the automatic cutting mechanism 17, so that the film-covering documents 16 are cut into multiple separate laminated documents 18. Ideally, the spacing interval between any two film-covering documents 16 should be identical. If the spacing intervals between the adjacent film-covering documents 16 are not identical, the positions of some cutting lines 19 are improper. Under this circumstance, the sizes of the laminated documents 18 are different or the laminated documents 18 are possibly damaged.

For solving the above drawbacks, the spacing interval between any two adjacent documents in the sheet feeding channel should be kept constant.

In accordance with a conventional method for controlling a constant spacing interval between any two adjacent documents, the documents are successively fed into the sheet feeding channel by the sheet pick-up roller at a constant time interval or at a specified distance between any two documents. Since the documents are transported by the sheet pick-up roller due to a friction force, the time periods required for feeding the documents into the sheet feeding channel are usually different. In other words, the conventional method fails to achieve the purpose of controlling a constant spacing interval between any two adjacent documents.

SUMMARY OF THE INVENTION

It is an object of the present invention to provide a spacing interval control method and a sheet laminating apparatus using such a spacing interval control method. By an automatic document feeding mechanism of the sheet laminating apparatus, multiple documents are successively transported to a sheet laminating mechanism of the sheet laminating apparatus at a constant spacing interval between any two adjacent ones of multiple documents.

In accordance with an aspect of the present invention, there is provided a spacing interval control method for controlling a constant spacing interval between any two adjacent ones of multiple documents. The documents are successively transported from an automatic document feeding mechanism to a sheet laminating mechanism. The automatic document feeding mechanism includes a sheet entrance, a sheet exit communicating with the sheet laminating mechanism, a sheet pick-up roller module, a sheet feeding channel, a transfer roller module, a first sensor and a second sensor. The multiple documents are successively transported from the sheet entrance to the sheet exit by the sheet pick-up roller module and/or the transfer roller module. The spacing interval control method includes the following steps. In a step (A), the multiple documents are successively fed and transported into the sheet feeding channel through the sheet entrance by the sheet pick-up roller module, so that the documents are successively advanced in the sheet feeding channel by the sheet pick-up roller module and/or the transfer roller module. In a step (B), the first sensor is used to detect a specified document that is being transported in the sheet feeding channel. Once a tail edge of the specified document is detected by the first sensor, the sheet pick-up roller module and/or the transfer roller module stops transporting the specified document. In a step (C), the second sensor is used to detect the specified document that is being transported in the sheet feeding channel and a next document following the specified document. Once a front edge of the next document is detected by the second sensor, the sheet pick-up roller module and/or the transfer roller module is enabled again, so that the specified document is continuously transported and the next document is continuously advanced in the sheet feeding channel by the sheet pick-up roller module and/or the transfer roller module. The second sensor is disposed at a rear end of the first sensor and spaced from the first sensor by the spacing interval.

In an embodiment, in the step (A), the specified document that is being transported in the sheet feeding channel is detected by the second sensor. Once the tail edge of the specified document is detected by the second sensor, the next document is fed into the sheet feeding channel through the sheet entrance by the sheet pick-up roller module.

In an embodiment, in the step (A), the specified document that is being transported in the sheet feeding channel is detected by a third sensor between the sheet pick-up roller module and the second sensor. Once the tail edge of the specified document is detected by the third sensor, the next document is fed into the sheet feeding channel through the sheet entrance by the sheet pick-up roller module.

In an embodiment, the automatic document feeding mechanism further includes a fourth sensor arranged at a rear end of the sheet feeding channel for discriminating whether the multiple documents are indeed fed into the sheet laminating mechanism and counting the number of documents fed into the sheet laminating mechanism.

In accordance with another aspect of the present invention, there is provided a sheet laminating apparatus having an automatic document feeding mechanism for controlling a constant spacing interval between any two adjacent ones of multiple documents. The multiple documents are successively transported from the automatic document feeding mechanism to a sheet laminating mechanism. The automatic document feeding mechanism includes a sheet feeding channel, a sheet pick-up roller module, a transfer roller module, a first sensor and a second sensor. The sheet feeding channel is arranged within the automatic document feeding mechanism and used as a path for transmitting the multiple documents. The sheet pick-up roller module is arranged in a vicinity of a sheet entrance for successively feeding and transporting the multiple documents into the sheet feeding channel through the sheet entrance. The transfer roller module is used for transporting the multiple documents from the sheet feeding channel to a sheet exit, which communicates with the sheet laminating mechanism. The first sensor and the second sensor are used for detecting transporting statuses of the documents in the sheet feeding channel. The first sensor and the second sensor are spaced from each other by the spacing interval. Once a tail edge of a specified document is detected by the first sensor and a front edge of a next document is detected by the second sensor, the specified document and the next document are simultaneously transported by the sheet pick-up roller module and/or the transfer roller module, so that the specified document and the next document are spaced from each other by the spacing interval and successively fed into the sheet laminating mechanism.

In an embodiment, once the tail edge of the specified document is detected by the second sensor, the next document is fed into the sheet feeding channel through the sheet entrance by the sheet pick-up roller module.

In an embodiment, the automatic document feeding mechanism further includes a third sensor between the sheet pick-up roller module and the second sensor for detecting transporting statuses of the multiple documents in the sheet feeding channel. Once the tail edge of the specified document is detected by the third sensor, the next document is fed into the sheet feeding channel through the sheet entrance by the sheet pick-up roller module.

In an embodiment, once the tail edge of the specified document is detected by the first sensor, the transfer roller module is disabled and stops transporting the specified document, but the sheet pick-up roller module is continuously enabled to transport and advance the next document.

In an embodiment, the transfer roller module includes a first transfer roller assembly and a second transfer roller assembly. Once the tail edge of the specified document is detected by the first sensor, the second transfer roller assembly is disabled and stops transporting the specified document, but the first transfer roller assembly is continuously enabled to transport and advance the next document.

In an embodiment, the automatic document feeding mechanism further includes a fourth sensor arranged at a rear end of the sheet feeding channel for discriminating whether the multiple documents are indeed fed into the sheet laminating mechanism and counting the number of documents fed into the sheet laminating mechanism.

In an embodiment, the sheet pick-up roller module includes a sheet pick-up roller for feeding the multiple documents into the sheet entrance, and a sheet separation roller and a sheet separation slice for offering a friction force on the multiple documents, so that one only document is allowed to be fed into the sheet feeding channel by the sheet pick-up roller module.

In accordance with a further aspect of the present invention, there is provided a spacing interval control method for controlling a constant spacing interval between any two adjacent ones of multiple documents. The multiple documents are successively heated and pressing by a sheet laminating apparatus and then cut into multiple separate and identical-sized laminated documents by an automatic cutting mechanism. The sheet laminating apparatus includes a sheet pick-up roller module, a sheet feeding channel used as a path for transmitting the multiple documents, a transfer roller module, a first sensor, a second sensor, a heating and pressing mechanism, a sheet entrance and a sheet exit communicating with an inlet of the heating and pressing mechanism. The multiple documents are successively transported from the sheet entrance to the sheet exit by the sheet pick-up roller module and/or the transfer roller module. The spacing interval control method includes the following steps. In a step (A), the multiple documents are successively fed and transported into the sheet feeding channel through the sheet entrance by the sheet pick-up roller module, so that the documents are successively advanced in the sheet feeding channel by the sheet pick-up roller module and/or the transfer roller module. In a step (B), the first sensor is used to detect a specified document that is being transported in the sheet feeding channel. Once a tail edge of the specified document is detected by the first sensor, the sheet pick-up roller module and/or the transfer roller module stops transporting the specified document. In a step (C), the second sensor is used to detect the specified document that is being transported in the sheet feeding channel and a next document following the specified document. Once a front edge of the next document is detected by the second sensor, the sheet pick-up roller module and/or the transfer roller module is enabled again, so that the specified document is continuously transported and the next document is continuously advanced in the sheet feeding channel by the sheet pick-up roller module and/or the transfer roller module. The second sensor is disposed at a rear end of the first sensor and spaced from the first sensor by the spacing interval.

In a step (D), the documents that are transported to the sheet exit are heated and pressed by the heating and pressing mechanism.

In an embodiment, in the step (A), the specified document that is being transported in the sheet feeding channel is detected by the second sensor. Once the tail edge of the specified document is detected by the second sensor, the next document is fed into the sheet feeding channel through the sheet entrance by the sheet pick-up roller module.

In an embodiment, in the step (A), the specified document that is being transported in the sheet feeding channel is detected by a third sensor between the sheet pick-up roller module and the second sensor. Once the tail edge of the specified document is detected by the third sensor, the next document is fed into the sheet feeding channel through the sheet entrance by the sheet pick-up roller module.

In an embodiment, the sheet laminating apparatus further includes a fourth sensor arranged at a rear end of the sheet feeding channel for discriminating whether the multiple documents are indeed fed into the heating and pressing mechanism and counting the number of documents fed into the heating and pressing mechanism.

In accordance with a still aspect of the present invention, there is provided a sheet laminating apparatus for controlling a constant spacing interval between any two adjacent ones of multiple documents and heating and pressing the documents. The multiple documents are successively heated and pressing by the sheet laminating apparatus and then cut into multiple separate and identical-sized laminated documents by an automatic cutting mechanism. The sheet laminating apparatus includes a heating and pressing mechanism, a sheet feeding channel, a sheet pick-up roller module, a transfer roller module, a first sensor and a second sensor. The heating and pressing mechanism is used for heating and pressing the multiple documents. The sheet feeding channel is arranged within the sheet laminating apparatus and used as a path for transmitting the multiple documents. The sheet pick-up roller module is arranged in a vicinity of a sheet entrance for successively feeding and transporting the multiple documents into the sheet feeding channel through the sheet entrance. The transfer roller module is used for transporting the multiple documents from the sheet feeding channel to a sheet exit, which communicates with the heating and pressing mechanism. The first sensor and a second sensor are used for detecting transporting statuses of the documents in the sheet feeding channel. The first sensor and the second sensor are spaced from each other by the spacing interval. Once a tail edge of a specified document is detected by the first sensor and a front edge of a next document is detected by the second sensor, the specified document and the next document are simultaneously transported by the sheet pick-up roller module and/or the transfer roller module, so that the specified document and the next document are spaced from each other by the spacing interval and successively fed into the heating and pressing mechanism.

In an embodiment, once the tail edge of the specified document is detected by the second sensor, the next document is fed into the sheet feeding channel through the sheet entrance by the sheet pick-up roller module.

In an embodiment, the sheet laminating apparatus further includes a third sensor between the sheet pick-up roller module and the second sensor for detecting transporting statuses of the multiple documents in the sheet feeding channel. Once the tail edge of the specified document is detected by the third sensor, the next document is fed into the sheet feeding channel through the sheet entrance by the sheet pick-up roller module.

In an embodiment, once the tail edge of the specified document is detected by the first sensor, the transfer roller module is disabled and stops transporting the specified document, but the sheet pick-up roller module is continuously enabled to transport and advance the next document.

In an embodiment, the transfer roller module includes a first transfer roller assembly and a second transfer roller assembly. Once the tail edge of the specified document is detected by the first sensor, the second transfer roller assembly is disabled and stops transporting the specified document, but the first transfer roller assembly is continuously enabled to transport and advance the next document.

In an embodiment, the sheet laminating apparatus further includes a fourth sensor arranged at a rear end of the sheet feeding channel for discriminating whether the multiple documents are indeed fed into the sheet laminating mechanism and counting the number of documents fed into the sheet laminating mechanism.

In an embodiment, the sheet pick-up roller module includes a sheet pick-up roller for feeding the multiple documents into the sheet entrance, and a sheet separation roller and a sheet separation slice for offering a friction force on the multiple documents, so that one only document is allowed to be fed into the sheet feeding channel by the sheet pick-up roller module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
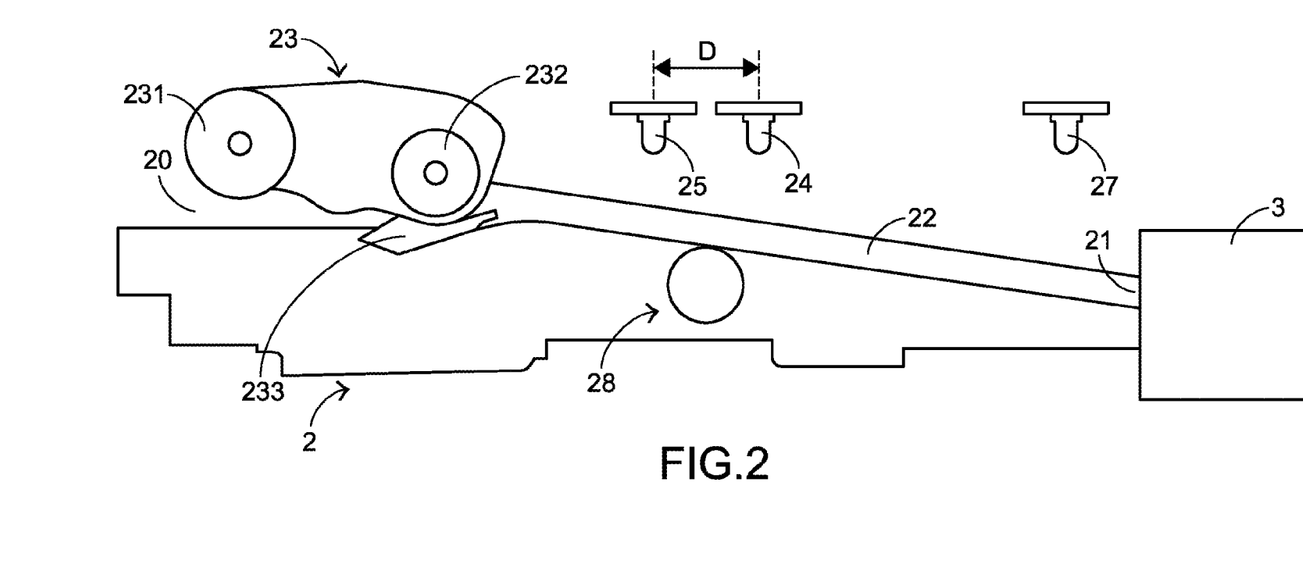
FIG. 2 is a schematic view illustrating a sheet laminating apparatus according to a first embodiment of the present invention.

FIG. 2 is a schematic view illustrating a sheet laminating apparatus according to a first embodiment of the present invention. As shown in FIG. 2, the sheet laminating apparatus comprises an automatic document feeding mechanism 2 and a sheet laminating mechanism 3. The sheet laminating mechanism 3 is connected to the rear end of a sheet feeding channel of the automatic document feeding mechanism 2. The automatic document feeding mechanism 2 comprises a sheet entrance 20, a sheet exit 21, a sheet feeding channel 22, a sheet pick-up roller module 23, a first sensor 24, a second sensor 25, a fourth sensor 27 and a transfer roller module 28. The sheet pick-up roller module 23 is arranged in the vicinity of the sheet entrance 20, and comprises a sheet pick-up roller 231, a sheet separation roller 232 and a sheet separation slice 233. The sheet feeding channel 22 is used as a path for transmitting documents. The sheet feeding channel 22 is arranged between the sheet entrance 20 and the sheet exit 21. The sheet exit 21 communicates with an inlet of the sheet laminating mechanism 3. In addition, the sheet pick-up roller module 23 and the transfer roller module 28 are used for transporting the document that is in the sheet feeding channel 22. The first sensor 24, the second sensor 25 and the fourth sensor 27 are used for detecting the transporting status of the document. In this embodiment, the first sensor 24 and the second sensor 25 are spaced from each other by a spacing interval D.

Figure 3:
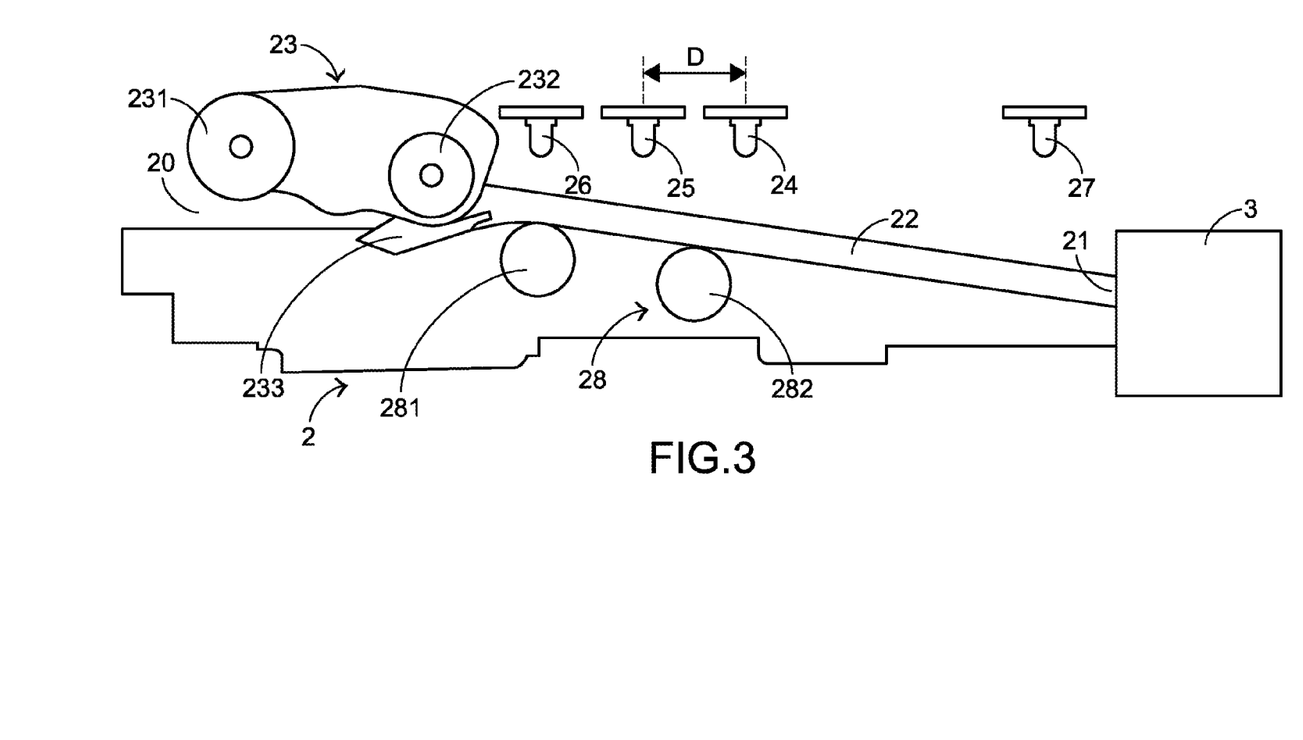
FIG. 3 is a schematic view illustrating a sheet laminating apparatus according to a second embodiment of the present invention.

FIG. 3 is a schematic view illustrating a sheet laminating apparatus according to a second embodiment of the present invention. In comparison with the first embodiment, the transfer roller module 28 of the second embodiment comprises a first transfer roller assembly 281 and a second transfer roller assembly 282. The first transfer roller assembly 281 can replace the sheet pick-up roller module 23 to transport the document that is in the sheet feeding channel 22. In addition, the automatic document feeding mechanism 2 of the second embodiment further comprises a third sensor 26 to detect the transporting status of the document.

Figure 4:
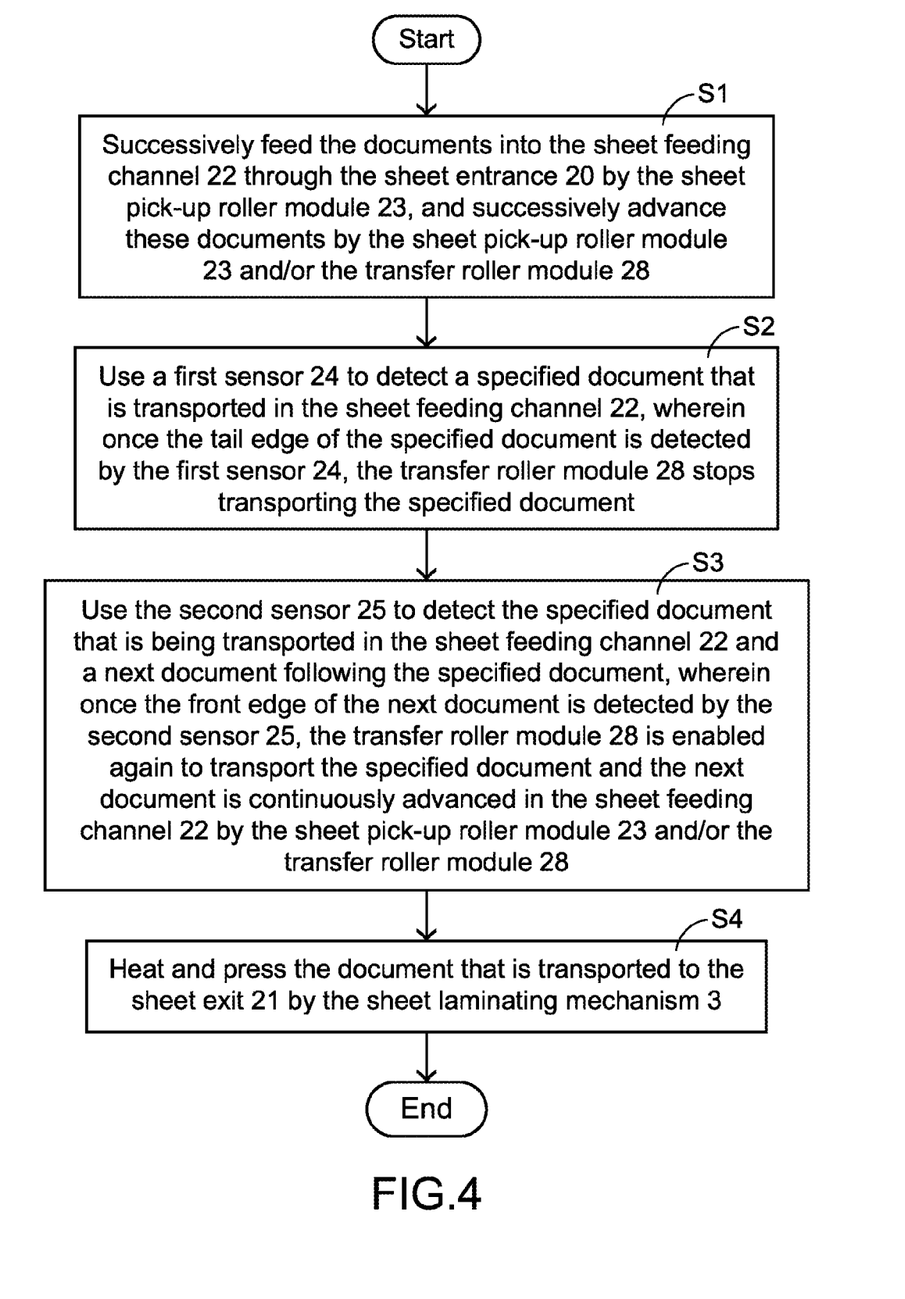
FIG. 4 schematically illustrates a flowchart of a method for controlling the spacing interval between any two documents.

FIG. 4 schematically illustrates a flowchart of a method for controlling the spacing interval between any two adjacent documents. Hereinafter, a method for controlling the spacing interval between any two adjacent documents with reference to FIG. 4.

In the step S1, the documents are successively fed into the sheet feeding channel 22 through the sheet entrance 20 by the sheet pick-up roller module 23. In addition, these documents are successively advanced in the sheet feeding channel 22 by the sheet pick-up roller module 23 and/or the transfer roller module 28.

In the step S2, a specified document that is transported in the sheet feeding channel 22 is detected by the first sensor 24. Once the tail edge of the specified document is detected by the first sensor 24, the transfer roller module 28 stops transporting the specified document.

In the step S3, the specified document that is being transported in the sheet feeding channel 22 and a next document following the specified document are detected by the second sensor 25. Once the front edge of the next document is detected by the second sensor 25, the transfer roller module 28 is enabled again to transport the specified document. At this moment, the next document is continuously advanced in the sheet feeding channel 22 by the sheet pick-up roller module 23 and/or the transfer roller module 28.

In the step S4, the document that is transported to the sheet exit 21 is heated and pressed by the sheet laminating mechanism 3.

The operating principles will be illustrated in more details with reference to FIGS. 2 and 3 again. Before the heating and pressing operation of the sheet laminating mechanism 3 is performed, the automatic document feeding mechanism 2 is enabled. When the document is fed into the sheet entrance 20 by the sheet pick-up roller 231 and transported to the sheet separation roller 232, the sheet separation roller 232 and the sheet separation slice 233 offers a friction force on the document, so that one only document is allowed to be fed into the sheet feeding channel 22.

By the way, the frictional forces resulted from the documents, the sheet separation slice 233 and the sheet separation roller 232 should be elaborately controlled. It is preferred that the frictional force U3 between the document and the sheet separation roller 232 is greater than the frictional force U1 between the document and the sheet separation slice 233, and the frictional force U1 is greater than the frictional force U2 between the documents (i.e. U3>U1>U2).

In the step S1 of FIG. 4 according to the first embodiment (see FIG. 2), a document (e.g. a first document) is fed into the sheet feeding channel 22 by the sheet pick-up roller module 23. Since the sheet pick-up roller module 23 and the transfer roller module 28 are enabled at this moment, the first document is advanced in the sheet feeding channel 22 by the sheet pick-up roller module 23 and the transfer roller module 28. Even if the tail edge of the first document is detected by the second sensor 25, the sheet pick-up roller module 23 and the transfer roller module 28 are continuously enabled and thus the first document is advanced in the sheet feeding channel 22. Meanwhile, the next document (e.g. a second document) is fed into the sheet feeding channel 22 by the sheet pick-up roller module 23.

In the step S1 of FIG. 4 according to the second embodiment (see FIG. 3), a first document is fed into the sheet feeding channel 22 by the sheet pick-up roller module 23. Since the first transfer roller assembly 281 (or the sheet pick-up roller module 23) and the second transfer roller assembly 282 are enabled at this moment, the first document is advanced in the sheet feeding channel 22 by the first transfer roller assembly 281 (or the sheet pick-up roller module 23) and the second transfer roller assembly 282. Even if the tail edge of the first document is detected by the third sensor 26 (or the second sensor 25), the first transfer roller assembly 281 (or the sheet pick-up roller module 23) and the second transfer roller assembly 282 are continuously enabled and thus the first document is advanced in the sheet feeding channel 22. Meanwhile, a second document is fed into the sheet feeding channel 22 by the sheet pick-up roller module 23.

In the steps S2 and S3 of FIG. 4 according to the first embodiment (see FIG. 2), once the tail edge of the first document is detected by the first sensor 24, the transfer roller module 28 is disabled and stops transporting the first document. In addition, the second sensor 25 waits for detecting the second document following the first document. Once the front edge of the second document is detected by the second sensor 25, the transfer roller module 28 will be enabled again. As such, the first document is continuously transported and the second document is continuously advanced in the sheet feeding channel 22 by the sheet pick-up roller module 23 and the transfer roller module 28.

In the steps S2 and S3 of FIG. 4 according to the second embodiment (see FIG. 3), once the tail edge of the first document is detected by the first sensor 24, the second transfer roller assembly 282 is disabled and stops transporting the first document. In addition, the second sensor 25 waits for detecting the second document following the first document. Once the front edge of the second document is detected by the second sensor 25, the second transfer roller assembly 282 will be enabled again. As such, the first document is continuously transported and the second document is continuously advanced in the sheet feeding channel 22 by the first transfer roller assembly 281 (or the sheet pick-up roller module 23) and the second transfer roller assembly 282.

Since the first sensor 24 and the second sensor 25 are spaced from each other by the spacing interval D, the first document and the second document are simultaneously advanced in the sheet feeding channel 22 when the front edge of the second document is detected by the second sensor 25 and the tail edge of said first document is detected by the first sensor 24. In other words, the multiple documents could be successively fed into the sheet laminating mechanism 3 at a constant spacing interval D between any two adjacent documents.

Moreover, the documents following the second document are successively fed into the sheet feeding channel 22 by the sheet pick-up roller module 23 according to the above-mentioned control method. As a consequence, the multiple documents could be successively fed into the sheet laminating mechanism 3 at a constant spacing interval D between any two adjacent documents.

In some embodiments, the automatic document feeding mechanism 2 further comprises a fourth sensor 27 at a rear end of the sheet feeding channel 22. Before the multiple documents are fed into the sheet laminating mechanism 3, the fourth sensor 27 could discriminate whether the multiple documents are indeed fed into the sheet laminating mechanism 3. In addition, the fourth sensor 27 could count the number of documents fed into the sheet laminating mechanism 3. According to the number of documents fed into the sheet laminating mechanism 3, the user can discriminate whether any paper jam event or other breakdown event occurs within the automatic document feeding mechanism 2.

In the step S4 of FIG. 4, the documents are successively transported to the sheet exit 21 and heated and pressed by the sheet laminating mechanism 3. By means of an automatic cutting mechanism (not shown in FIGS. 2 and 3) that is connected to the outlet of the sheet laminating mechanism 3, the heated and pressed documents are then cut into multiple separate laminated documents. Since there is a constant spacing interval between any two adjacent ones of the heated and pressed documents, the automatic cutting mechanism is set to cut the heated and pressed documents at a constant cutting cycle. In other words, the heated and pressed documents could be easily cut into identical-sized laminated documents.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A spacing interval control method for controlling a constant spacing interval between any two adjacent ones of multiple documents, said documents being successively transported from an automatic document feeding mechanism to a sheet laminating mechanism, said automatic document feeding mechanism comprising a sheet entrance, a sheet exit communicating with said sheet laminating mechanism, a sheet pick-up roller module, a sheet feeding channel, a transfer roller module, a first sensor and a second sensor positioned upstream of said first sensor in a sheet feeding direction said multiple documents being successively transported from sheet entrance to said sheet exit by said sheet pick-up roller module and/or said transfer roller module, said spacing interval control method comprising steps of:
   (A) successively feeding and transporting said multiple documents into said sheet feeding channel through said sheet entrance by said sheet pick-up roller module, so that said documents are successively advanced in said sheet feeding channel by said sheet pick-up roller module and/or said transfer roller module, said specified document that is being transported in said sheet feeding channel is detected by said second sensor, wherein once said tail edge of said specified document is detected by said second sensor, said next document is fed into said sheet feeding channel through said sheet entrance by said sheet pick-up roller module;
   (B) using said first sensor to detect a specified document that is being transported in said sheet feeding channel, wherein once a tail edge of said specified document is detected by said first sensor, said sheet pick-up roller module and/or said transfer roller module stops transporting said specified document; and
   (C) using said second sensor to detect said specified document that is being transported in said sheet feeding channel and a next document following said specified document, wherein once a front edge of said next document is detected by said second sensor, said sheet pick-up roller module and/or said transfer roller module is enabled again, so that said specified document is continuously transported and said next document is continuously advanced in said sheet feeding channel by said sheet pick-up roller module and/or said transfer roller module, wherein said second sensor is disposed at a rear end of said first sensor and spaced from said first sensor by said spacing interval.

2. The spacing interval control method according to claim 1 wherein in said step (A), said specified document that is being transported in said sheet feeding channel is detected by a third sensor between said sheet pick-up roller module and said second sensor, wherein once said tail edge of said specified document is detected by said third sensor, said next document is fed into said sheet feeding channel through said sheet entrance by said sheet pick-up roller module.

3. The spacing interval control method according to claim 1 wherein said automatic document feeding mechanism further comprises an additional sensor arranged at a rear end of said sheet feeding channel for discriminating whether said multiple documents are indeed fed into said sheet laminating mechanism and counting the number of documents fed into said sheet laminating mechanism.

4. A spacing interval control method for controlling a constant spacing interval between any two adjacent ones of multiple documents, said multiple documents being successively heated and pressing by a sheet laminating apparatus and then cut into multiple separate and identical-sized laminated documents by an automatic cutting mechanism, said sheet laminating apparatus comprising a sheet pick-up roller module, a sheet feeding channel used as a path for transmitting said multiple documents, a transfer roller module, a first sensor, a second sensor positioned upstream of said first sensor in a sheet feeding direction, a heating and pressing mechanism, a sheet entrance and a sheet exit communicating with an inlet of said heating and pressing mechanism, said multiple documents being successively transported from said sheet entrance to said sheet exit by said sheet pick-up roller module and/or said transfer roller module, said spacing interval control method comprising steps of:
   (A) successively feeding and transporting said multiple documents into said sheet feeding channel through said sheet entrance by said sheet pick-up roller module, so that said documents are successively advanced in said sheet feeding channel by said sheet pick-up roller module and/or said transfer roller module, said specified document that is being transported in said sheet feeding channel is detected by said second sensor, wherein once said tail edge of said specified document is detected by said second sensor, said next document is fed into said sheet feeding channel through said sheet entrance by said sheet pick-up roller module;
   (B) using said first sensor to detect a specified document that is being transported in said sheet feeding channel, wherein once a tail edge of said specified document is detected by said first sensor, said sheet pick-up roller module and/or said transfer roller module stops transporting said specified document;
   (C) using said second sensor to detect said specified document that is being transported in said sheet feeding channel and a next document following said specified document, wherein once a front edge of said next document is detected by said second sensor, said sheet pick-up roller module and/or said transfer roller module is enabled again, so that said specified document is continuously transported and said next document is continuously advanced in said sheet feeding channel by said sheet pick-up roller module and/or said transfer roller module, wherein said second sensor is disposed at a rear end of said first sensor and spaced from said first sensor by said spacing interval; and
   (D) heating and pressing said documents that are transported to said sheet exit by said heating and pressing mechanism.

5. The spacing interval control method according to claim 4 wherein in said step (A), said specified document that is being transported in said sheet feeding channel is detected by a third sensor between said sheet pick-up roller module and said second sensor, wherein once said tail edge of said specified document is detected by said third sensor, said next document is fed into said sheet feeding channel through said sheet entrance by said sheet pick-up roller module.

6. The spacing interval control method according to claim 4 wherein said sheet laminating apparatus further comprises an additional sensor arranged at a rear end of said sheet feeding channel for discriminating whether said multiple documents are indeed fed into said heating and pressing mechanism and counting the number of documents fed into said heating and pressing mechanism.

* * * * *